United States Patent [19]

Gantts et al.

[11] 4,186,041

[45] Jan. 29, 1980

[54] METHOD AND DEVICE FOR INSULATING COVERING OF CABLES

[76] Inventors: Vitaly L. Gantts, poselok Malakhovka, Mikhnevskoe shosse, 15/3, kv. 10, Ljubertsy Moskovskoi oblasti; Nikolai V. Krupenin, Baikalskaya ulitsa, 51, korpus 1, kv. 116, Moscow; Gennady I. Meschanov, ulitsa Mashtokova, 13, kv. 67, Podolsk Moskovskoi oblasti; Izyaslav B. Peshkov, prospekt Mira, 184, korpus 2, kv. 146, Moscow, all of U.S.S.R.

[21] Appl. No.: 800,614

[22] Filed: May 26, 1977

[30] Foreign Application Priority Data

Jun. 4, 1976 [SU] U.S.S.R. .......................... 2359604[I]

[51] Int. Cl.[2] ....................... B32B 31/26; H01B 13/06

[52] U.S. Cl. ..................................... 156/53; 156/272; 156/273; 156/274; 219/10.41

[58] Field of Search ............... 156/272, 275, 273, 274, 156/51, 52, 53, 54; 427/45, 46; 219/10.41, 10.43, 10.53, 10.57, 6.5, 7.5, 9.5

[56] References Cited

U.S. PATENT DOCUMENTS

| | | | |
|---|---|---|---|
| 2,371,459 | 3/1945 | Mittelmann | 219/10.41 |
| 3,572,286 | 3/1971 | Forney | 427/45 X |
| 3,960,629 | 6/1976 | Goldsworthy | 156/272 |

*Primary Examiner*—John T. Goolkasian
*Assistant Examiner*—William H. Thrower
*Attorney, Agent, or Firm*—Lackenbach, Lilling & Siegel

[57] ABSTRACT

The proposed method for insulating the covering of cables resides in high-frequency heating of the cable conductor wrapped with tapes from polymer materials, such as polyimidepolytetrafluoroethylene films, in a transverse magnetic field over a period of time required to reach the material softening temperature and maintaining this temperature until the polymer material is baked, which is done in a longitudinal magnetic field. The device for carrying out the above method comprises an induction loop heater and a cylindrical induction heater arranged coaxially therewith. The invention can most advantageously be used to provide for quality insulation of cables up to 70 sq. mm in cross section.

3 Claims, 2 Drawing Figures

METHOD AND DEVICE FOR INSULATING COVERING OF CABLES

Figure 2:
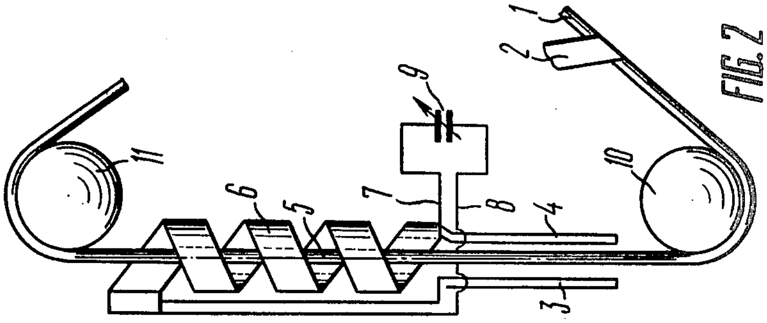

The present invention relates to the fabrication of cables with film insulation, and more particularly to a method and a device for insulating coverings of cables.

The invention can most advantageously be used to provide for quality insulation of cables from 1.5 to 70 sq.mm in cross section.

The stringent requirements imposed on cables, namely, on the stability of their insulation and physicomechanical characteristics along their length, which is a prerequisite for ensuring reliable operation of, for example, submersible or traction motor windings, cannot be adequately met by conventional fabrication methods.

There are known methods for insulating covering of cables wherein an insulating material, such as a polymer film, is applied on the cable conductor, which is then baked to form a solid, waterproof sheath. The baking of the insulating layer by heating it in, for example, resistance furnaces does not always provide for high electrical and physicomechanical properties of cables, particularly when the conductor cross section exceeds 3–5 sq.mm and the insulation layer is thicker than 0.15–0.2 mm. In the latter case, the most efficient way to bake the insulating cover is by high-frequency induction heating.

Induction heating permits attaining a higher quality of baking since it allows the temperature of the inner layers to exceed that of the outer layers, during heating of the insulation, which is impossible, in principle, while heating in resistance furnaces, salt bath, etc. In addition, the induction heating process is more efficient, especially in the case of thicker cables.

According to another prior art method, closest in concept to the one disclosed herein, a conductor insulated in advance is passed along the plates of an induction loop heater, whereby the conductor is acted upon by a transverse magnetic field. Heating of nonmagnetic materials in a transverse magnetic field is known to be most efficient.

The above-mentioned requirements to wires intended for use in windings, namely, to the stability of their characteristics along their length, cannot be met by the latter method either, which is particularly true in the case of large-diameter round cables or cables rectangular in cross section. This can be explained by the following: high quality of an insulating cover is attained only in case an optimum heating curve is obtained during baking as the conductor is moving through the heater, i.e. when a portion of the conductor (first heating zone) is heated sufficiently fast to the insulating material softening temperature at which adequate baking is ensured, while another portion of the conductor (second heating zone) is held at this temperature over a period of time sufficient for the required characteristics of the insulating cover to be attained. In the case of heating only in a transverse magnetic field with use being made of an induction loop heater, the ideal temperature curve is obtained by spreading apart the plates of the induction heater in the second heating zone, i.e. by reducing its efficiency. Besides, in the case of round conductors of large cross section (over 10 sq.mm) and conductors of rectangular cross section, considerable electrodynamic forces appear in the induction loop heater, which throw the conductor out of the inductor, thus adversely affecting the stability of the conductor's characteristics along its length. The higher the side-to-side ratio of the rectangular conductor, the stronger these forces are.

It is an object of the present invention to improve the uniformity of baking of cycle insulating covers.

Another object of the invention is to enhance the efficiency of the process of insulating covering of cables.

Still another object of the invention is to ensure the stability of the cable characteristics along its length.

These objects are attained by that in the proposed method for insulating covering of cables by way of high-frequency heating of the cable conductor wrapped with tapes from polymer materials, such as polyimide-polytetrafluoroethylene films, in a transverse magnetic field over a period of time required to reach the polymer material softening temperature and maintaining this temperature until the polymer material is baked, according to the invention, the baking is carried out in a longitudinal magnetic field.

The invention is also aimed at providing a device for carrying out the above method, comprising an induction loop heater and a cylindrical induction heater arranged coaxially therewith.

With a view to using a single power supply and simplifying the structure and operation of the device, both inductors should preferably be connected in series.

It is also preferable to connect a capacitor in parallel with the cylindrical induction heater at the point of its connection to the plates of the induction loop heater, to provide for the required currents through the heaters.

The use of a longitudinal magnetic field not only makes it possible to heat the conductor and maintain the required temperature in the second heating zone, but also to hold (center) the conductor in the induction loop heater, which substantially increases the stability of the process of insulating covering of round and rectangular conductors. Owing to the fact that the length of the zone of action of the transverse magnetic field is shorter according to the proposed method in contrast with the prior art one, the electrodynamic forces ejecting the conductor from the induction heater are minimized.

Figure 1:
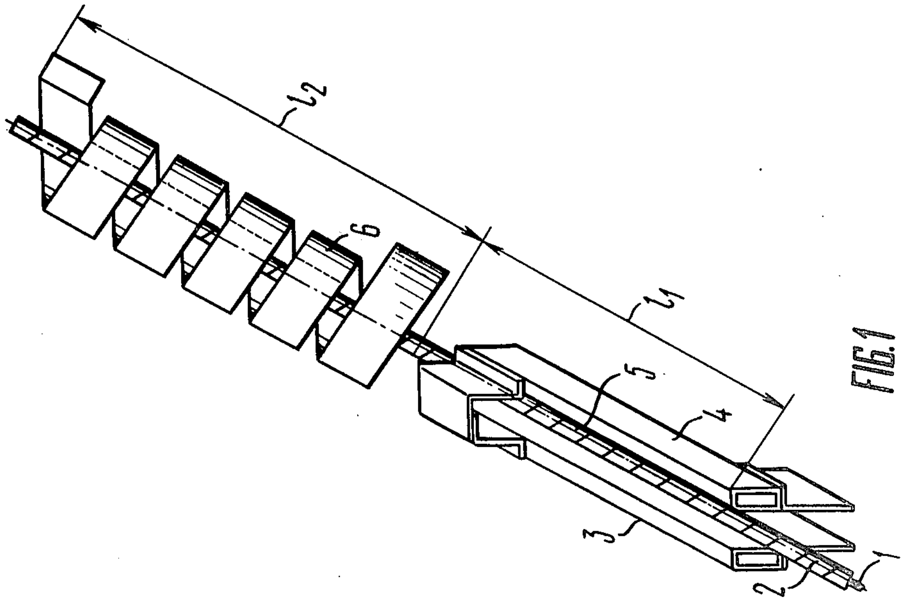

The invention will now be described in greater detail with reference to specific embodiments thereof, taken in conjunction with the accompanying drawings, wherein:

FIG. 1 shows schematically the proposed method for insulating covering of cables and a device for effecting same, according to the invention; and FIG. 2 shows an embodiment of the proposed device with an induction loop heater and a cylindrical induction heater connected in series, as well as a capacitor connected in parallel with the cylindrical induction heater at the point of its connection to the plates of the induction loop heater, according to the invention.

Referring now to the drawings, the proposed method will now be described.

A conductor 1 (FIG. 1) insulated with three tapes 2 of polyimide doubled with a copolymer of polytetrafluoroethylene with hexafluoropropylene is passed between plates 3 and 4 of an induction loop heater, along their longitudinal axis 5. As this takes place, the tapes 2 are heated from the conductor 1 to a temperature of about 330° C. (baking of the tape insulation), then the conductor is transferred to a cylindrical induction heater 6 where it is held at the above temperature over a period of time necessary for the insulation to be baked.

The required temperatures depend on the material of the films being baked: 360° C. on the surface of polytetrafluoroethylene, 390° C. on the conductor; 330° C. on the surface of a double polyimide-polytetrafluoroethylene film, 350° C. on the conductor.

Judging from experience, the optimum ratio of the heating time to the time during which all known types of films are held at this temperature lies within 0.7 to 0.8 with the ratio of length $l_1$ of the induction loop heater plates to length $l_2$ of the cylindrical induction heator also lying within 0.7 to 0.8, this length ratio ensuring optimum baking conditions. In addition, such ratios ensure optimum efficiency of the device as a whole.

FIG. 1 shows an embodiment of the device for carrying out the proposed method, in which the coaxially arranged induction loop heater and cylindrical induction heater may be energized from individual power supplies (not shown).

In another embodiment (FIG. 2) the whole device is energized from a single power supply, for example, a high-frequency generator (not shown), which facilitates synchronization of switching on and off of both heaters, as well as regulating the rate of heating of both, and simplifies the structure and operation of the device.

As can be seen from FIG. 2, the cylindrical induction heater 6 is connected in series with the plates 3 and 4 of the induction loop heater, and a variable capacitor 9 is connected to ends 7 and 8 of the induction loop heater plates, in parallel with the cylindrical induction heater 6.

By varying the capacitance of the capacitor 9 it is possible to ensure the required current ratios in both heaters in accordance with the desired baking conditions.

The proposed device operates as follows.

The conductor 1 insulated with the polymer film 2 is passed from a feeding reel, via a bottom guide roller 10 and between the plates 3 and 4 of the induction loop heater in which the polymer insulating film is heated from the conductor 1 in a transverse magnetic field to the polymer material softening temperature. Then, the conductor is transferred to the cylindrical induction heater 6 wherein the polymer material softening temperature is maintained owing to the action of a longitudinal electromagnetic field, and the insulating film is baked. Therewith, the cylindrical induction heater 6 also serves as a means for centering (holding) the conductor along the axis 5 in the zone of the induction loop heater. Thereafter, the conductor with the baked insulating cover passes through a cooling zone and via a top guide roller 11 to a take-up reel and, finally, to a spool (not shown).

What is claimed is:

1. A method of insulating cables comprising the steps of applying a covering to the cable conductor in the form of tapes of polymer materials such as polytetrafluoroethylene and polyimide doubled with a copolymer of polytetrafluorothylene with hexafluoropropylene, subjecting the cable conductor to high-frequency heating in a transverse magnetic field for a period of time required to reach a temperature at which the covering tape material softens, and holding at this temperature within a longitudinal magnetic field, said holding time exceeding said heating time by 1/0.7 to 1/0.8 times.

2. A device for insulation covering of cables, comprising an induction loop heater for generating a transverse magnetic field for heating a conductor covered with tapes of a polymer material with high-frequency currents to the softening point of the covering tape material; a cylindrical induction heater arranged coaxially with said induction loop heater for generating a longitudinal magnetic field wherein said material is held until it is baked; and at least one power supply for said induction heater, the ratio of the length of the induction loop heater to that of the cylindrical induction heater being within the range of 0.7 to 0.8.

3. A device as claimed in claim 2, further comprising a capacitor connected in parallel with said cylindrical induction heater at the point where it is connected to said induction loop heater, said induction loop heater and cylindrical induction heater being interconnected in series.

* * * * *